United States Patent [19]
Gaskins et al.

[11] Patent Number: 5,802,356
[45] Date of Patent: Sep. 1, 1998

[54] CONFIGURABLE DRIVE CLOCK

[75] Inventors: Darius Gaskins; James R. Lundberg, both of Austin, Tex.

[73] Assignee: Integrated Device Technology, Inc., Santa Clara, Calif.

[21] Appl. No.: 748,567

[22] Filed: Nov. 13, 1996

[51] Int. Cl.[6] .................................................. G06F 1/10
[52] U.S. Cl. ............................................................ 395/555
[58] Field of Search ................................. 395/551, 555, 395/556, 558, 559, 309, 311; 327/147

[56] References Cited

U.S. PATENT DOCUMENTS

| | | | |
|---|---|---|---|
| 4,975,593 | 12/1990 | Kurakazu et al. | 327/141 |
| 5,359,232 | 10/1994 | Eitrheim et al. | 327/116 |
| 5,371,880 | 12/1994 | Bhattacharya | 395/551 |
| 5,434,996 | 7/1995 | Bell | 395/551 |
| 5,561,692 | 10/1996 | Maitland et al. | 375/371 |
| 5,623,644 | 4/1997 | Self et al. | 395/558 |
| 5,625,806 | 4/1997 | Kromer | 395/556 |
| 5,666,322 | 9/1997 | Conkle | 365/233 |
| 5,691,660 | 11/1997 | Busch et al. | 327/141 |

*Primary Examiner*—Thomas M. Heckler
*Attorney, Agent, or Firm*—James W. Huffman

[57] ABSTRACT

An apparatus and method which provides specified hold times for communication signals transmitted from a processing device that is capable of operating at different frequencies, to external devices, is provided. The apparatus includes a clock multiplier which generates an internal clock signal which is a multiple of an external clock, a ring oscillator, which provides a number of outputs of the same frequency as the internal clock, but at fixed phase offsets from the internal clock, and clock select circuitry, which selects one of the outputs from the ring oscillator, depending on the speed of the internal clock, to be used as a drive clock signal for a bus unit. Selection of one of the phase offset outputs provides for a specified hold time regardless of the internal clock speed of the processing device.

35 Claims, 5 Drawing Sheets

CONFIGURABLE DRIVE CLOCK

BACKGROUND OF THE INVENTION

1. Field of the Invention

This invention relates in general to clock circuits in computer systems, and more particularly to a method and apparatus for providing sufficient setup and hold time for devices communicating with a processing device.

2. Description of the Related Art

In computer systems, an oscillator produces a periodic signal which is used as a clock for sending out special timing pulses at precisely controlled intervals. The circuits within a computer system transmit and receive information at these precisely controlled intervals.

More specifically, if one device wishes to transmit information to another, it places the information to be transferred on a bus (or signal line) at some time prior to a clock transition, typically the rising edge of a clock cycle. It then holds the information on the bus until some time after the clock transition. The receiving device reads the information on the bus during the clock transition to complete the information transfer.

Since it takes a finite amount of time for the transmitting device to place information on the bus, and a finite amount of time for the receiving device to read (or latch) the information from the bus, specifications are established for particular communication buses which define the setup time (the amount of time information must be present prior to a clock transition) and the hold time (the amount of time information must remain on the bus after a clock transition) required for successful transmission of information.

In early computer systems, establishment of setup and hold time was not a big problem. For example, in the original PC the primary communication bus was exactly matched to the Intel 8088 microprocessor. Both the bus and the 8088 operated at the same speed (4.77 MHz). On a first clock transition, an address was put on the bus, and on a second clock transition, the data was actually moved. The address was placed on the bus by the 8088 at a fixed time prior to the first transition, and the data was placed on the bus at a fixed time prior to the second transition. The address and data were held on the bus for a fixed time after their respective clock transitions. Since the 8088 was only designed to operate at one particular speed, and since the speed of the bus was identical to that of the 8088, setup and hold times were easily provided for.

However, as PC technology evolved, advances in microprocessor design outpaced that of peripheral devices. To accommodate this difference, and to allow a computer system to operate as fast as possible, a new bus architecture was developed which utilized multiple oscillators to control timing signals. For example, in the IBM AT computer, the microprocessor speed, time-of-day clock, system timer, and bus speed were separated and could be altered independently. As a result, separate clocks could be used for the microprocessor and the system bus. This change enabled expansion boards to operate at a lower speed from that of the microprocessor. One oscillator was provided to control the microprocessor, and a second oscillator was provided to control the system bus. Bus control circuitry was provided which synchronized communication between the microprocessor and the system bus.

As microprocessor advances continued, the speed of the system bus remained the same (8 MHz) while the speed of the microprocessor increased, from 8 MHz to 12 MHz, to 16 MHz. However, each microprocessor was designed to operate at a specified frequency, and to communicate over a particular bus having a specified frequency. Therefore, setup and hold times were specified, and provided for, within the internal bus design of the microprocessor.

Although further advances in technology have increased the internal operating speed of the microprocessor, in general, microprocessors are still designed to operate at a specified frequency, and to communicate with external buses operating at specified frequencies. Setup and hold times for the external buses are defined by the processor, and are intrinsic in the operation of the processor. Devices that wish to communicate with the processor must be designed to meet the setup and hold time for the processor.

As processor technology continues to advance, microprocessor designers wish to provide processors which are capable of operating at a number of different internal frequencies, and which can communicate with external buses of selectably different frequencies. However, the dedicated delay circuits of the prior art cannot produce consistent delays to meet hold times, as the speed of processor is changed.

What is needed is a method and apparatus which can be incorporated within a microprocessor, which allows the processor to meet varying hold time specifications of different external buses, and which may be used with microprocessors that are designed to operate at multiple internal frequencies. In addition, what is needed is a microprocessor which provides variation and control over setup and hold times to all for system optimization.

SUMMARY

To address the above-detailed deficiencies, it is an object of the present invention to provide an apparatus and method for controlling the hold time of signals output by a bus unit in a processing system where buses external to the processing system operate at varying frequencies, and where the processing system can operate at a number of different internal frequencies.

It is a further object of the present invention to provide selectable output hold times for a processing system.

It is another object of the present invention to vary the phase of a drive clock signal based on the internal clock speed of the processing system.

Accordingly, in attainment of the aforementioned objects, it is a feature of the present invention to provide a computer processing system, where the processing system communicates with devices external to the processing system. The processing system includes: an external clock signal, for establishing a time reference for the processing system, and for the devices external to the processing system; and a clock multiplier, connected to the external clock signal, for generating an internal clock signal which is a multiple of the external clock signal. The multiple is typically an integer from 2 to 5, but may in some instances be a fraction, such as 1.5.

The processing system also includes an internal bus, for transmitting information within the processing system; an external bus, for transmitting the information to the devices external to the processing system; and a bus unit, connected to the internal bus, and to the external bus, for transmitting the information between the internal bus and the external bus. In one embodiment, both the internal and external buses include address, data and control information.

The processing system further includes: a configurable clock adjust system, connected to the clock multiplier, and to the bus unit, for providing a drive clock signal to the bus unit, the drive clock signal providing configurable hold time for the information transmitted by the bus unit from the internal bus to the external bus.

Another aspect of the present invention is to provide a configurable drive clock generator for selectably establishing hold time for signals output from a processing device operating at an internal clock speed, to external devices operating at an external clock speed.

The configurable drive clock generator includes: a clock multiplier, connected to an external clock signal, for multiplying the external clock signal by a predetermined amount, and for producing an internal clock signal; a ring oscillator, connected to the internal clock signal, for providing a plurality of output signals, the plurality of output signals having the same frequency as the internal clock signal, but differing in phase from each other, and from the internal clock signal; and selection logic, connected to the plurality of output signals, for selecting one of the plurality of output signals to be a drive clock signal; wherein the drive clock signal establishes the hold time for signals output from the processing device to the external devices. As the frequency of the internal clock varies, based on the predetermined multiplier, the amount of phase delay required to provide sufficient hold time also varies. The selection logic utilizes the internal clock speed to determine which of the phase delay signals provides sufficient hold time, and selects this signal to be used as the drive clock for the processing system.

In yet another aspect, it is a feature of the present invention to provide a method for controlling the hold time of signals output from a processing system by a bus unit to external devices, where the processing system operates at an internal clock speed which may be varied, and the external devices operate at an external clock speed. The method includes: providing a number of differing phase delay clocks, each of the delay clocks having the same frequency as the internal clock speed which may be varied; determining which one of the differing phase delay clocks will provide the desired hold time for the signals output by the bus unit; and selecting the one of the differing phase delay clocks to be provided to the bus unit as a drive clock.

An advantage of the present invention is that a single drive clock circuit may be used on a processor which is capable of operating at a number of different internal operating speeds.

Another advantage of the present invention is that hold time specifications can be met by a multiple frequency processor, without modifying the design of the bus unit, or the drive clock.

A further advantage of the present invention is that by providing a variable phase drive clock, the processor may be adjusted to optimize setup and hold time for an external bus.

Yet another advantage of the present invention is that user control of the phase delay, and therefore the hold time, can be provided for, either via input signals to the processor, or via software routines in BIOS.

BRIEF DESCRIPTION OF THE DRAWINGS

These and other objects, features, and advantages of the present invention will become better understood with regard to the following description, and accompanying drawings where.

DETAILED DESCRIPTION

Figure 1:
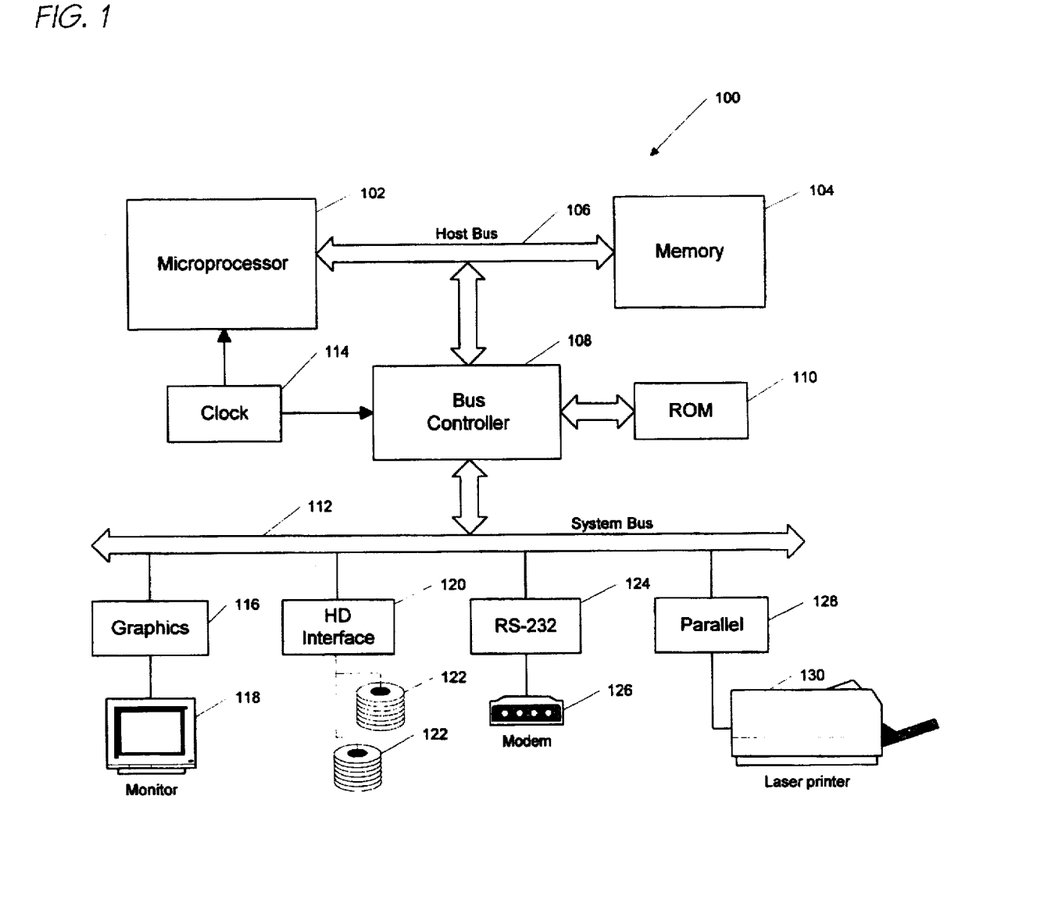
FIG. 1 is a block diagram of a computer system which can incorporate features of the present invention, illustrating a system bus, and connection between a microprocessor and external devices.

Referring to FIG. 1, a block diagram of a computer system 100 is shown. The computer system 100 illustrates an exemplary environment for the processor incorporating the present invention. The computer system 100 includes a microprocessor 102 connected to a memory 104 via a host bus 106. Also connected to the microprocessor 102 and the memory 104 via the host bus 106 is a bus controller 108. The bus controller 108 provides an interface between the host bus 106 and a ROM 110, and an expansion bus 112. A system clock 114 is provided to both the microprocessor 102 and the bus controller 108. Connected to the expansion bus 112 is a monitor 118 via a graphics controller 116, hard disk drives 122 via a disk interface 120, a modem 126 via an RS-232 interface 124, and a printer 130 via a parallel port 128.

In operation, the microprocessor 102 executes macro instructions retrieved from either the memory 104, the ROM 110 or the hard disks 122. The microprocessor can retrieve data from or store data to the memory 104 or the hard disks 122. In addition, the microprocessor can send data to either the modem 126 or the printer 130. A user interface to the microprocessor is provided by the monitor 118. The computer system 100 is typical of the type of computing system environment into which a pipeline processor according to the present invention may be used.

In one embodiment, the host bus 106 may operate at bus speeds of 50, 60 or 66 MHz, and the microprocessor 102 may operate at an internal clock speed which is a 1X, 2X, 3X, 4X or 5X multiple of the bus speed. The system bus 112 may operate at 25, 30 or 33 MHz.

Figure 2:
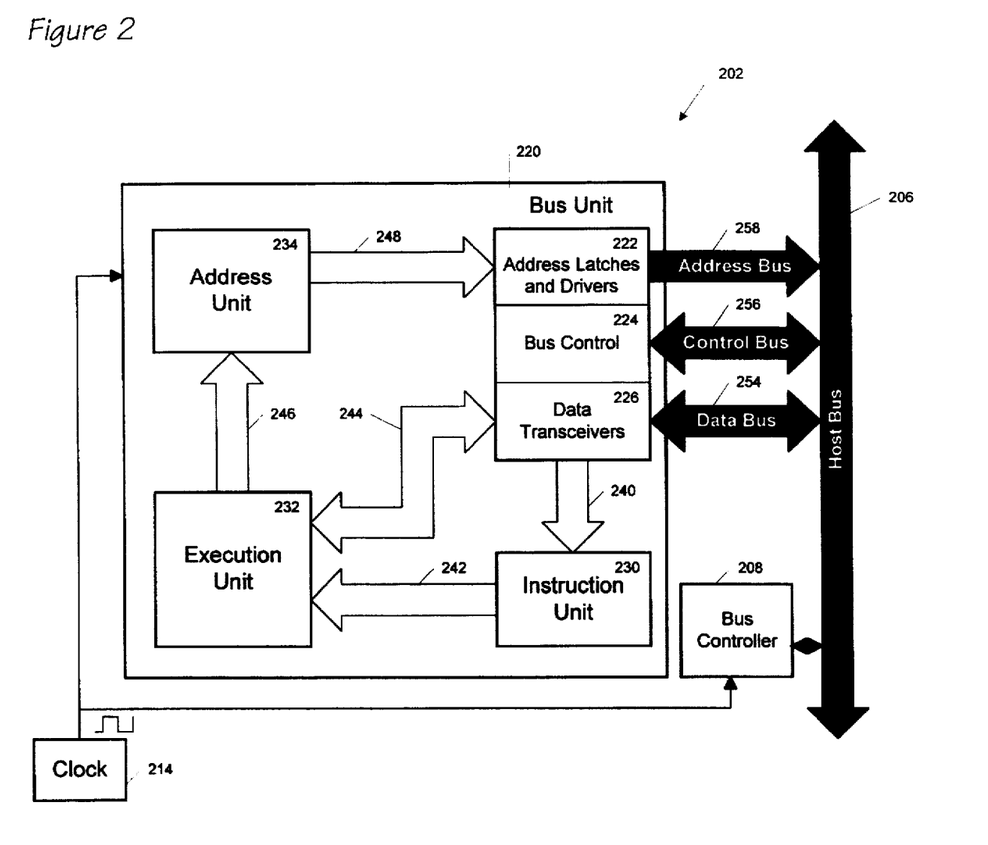
FIG. 2 is a block diagram of a microprocessor, illustrating connection between its internal bus, and a system bus.

Now referring to FIG. 2, a processor 202 is shown. The processor 202 includes a bus unit 220 which is connected to a host bus 206 via a data bus 254, a control bus 256 and an address bus 258. The bus unit 220 includes address latches and drivers 222, bus control circuitry 224 and data transceivers 226. The data transceivers 226 are connected to the data bus 254, the bus control circuitry 224 is connected to the control bus 256, and the address latches 222 are connected to the address bus 258. The bus unit 220 is connected to an instruction unit 230 via an instruction bus 240. The instruction unit 230 is also connected to an execution unit 232 via a micro instruction bus 242. The execution unit 232 is connected to an address unit 234 via bus 246, and to the bus unit 220 via bus 244. The address unit 234 is connected to bus unit 220 via bus 248.

The processor 202 is also connected to clock circuitry 214 which provides a periodic signal to both the processor 202, and to a bus controller 208. It should be understood that while the clock circuitry 214 is shown to provide the same clock signal to both the processor 202 and the bus controller 208, the clock circuitry 214 could also provide different clock signals to the processor 202 and the bus controller 208.

In operation, processor instructions are received by the processor 202 via the data bus 254, and are provided by the bus unit 220 to the instruction unit 230. The instruction unit 230 decodes the instructions into micro instructions which are provided to the execution unit 232 via the bus 242. The execution unit 232 executes the micro instructions and either provides address information to the address unit 234 via the bus 246, or reads/writes data to the bus unit 220 via the bus 244. The bus unit 220 is responsible for coordinating transfer of address, data and control signals between the internal buses 240–248 of the processor 202, and the host bus 206.

More specifically, when the microprocessor 202 performs a read or write operation, it initiates a sequence of events called a bus cycle. During a bus cycle, the microprocessor places the address on the address bus, sets the control bus lines to indicate the type of transaction (such as a memory read or I/O write bus cycle), and transfers the data between the target location and itself. This happens in a very orderly fashion, with each step occurring at the proper point during the appropriate time slot. It is the bus unit 220 that is tasked by the microprocessor 202 with the job of running bus cycles when required.

Figure 3:
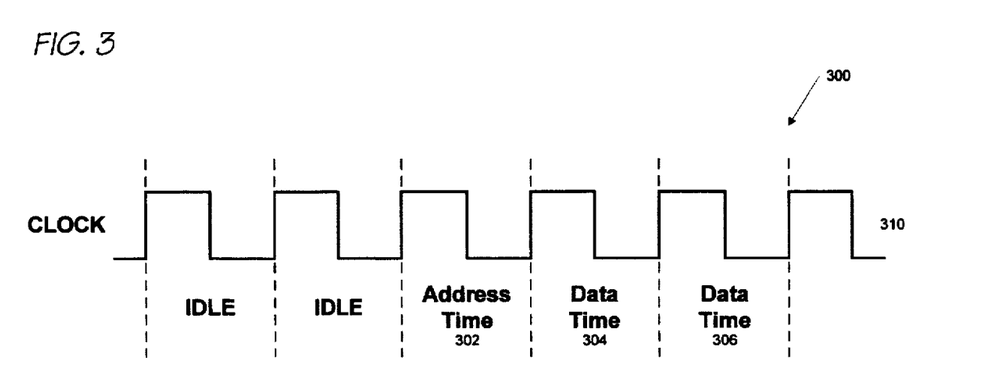
FIG. 3 is a timing diagram illustrating data transfer phases of a clock signal.

Now referring to FIG. 3, a timing diagram 300 is shown which illustrates a clock signal 310 having an address time 302, and data times 304, 306. For purposes of illustration, the clock signal 310 is intended to reflect clock cycles on the host bus 206. During the address time 302, the bus unit 220 places the address on the address bus and the bus cycle definition on the control bus lines. During the data time 304, the bus unit 220 expects data to be transferred between itself and the currently addressed device. If a read were in progress, the bus unit 220 reads the data from the data bus 254 and terminates the bus cycle. If a write were in progress, the bus unit 220 places the data on the data bus 254 and terminates the bus cycle. In some instances, data transfer may require two clock cycles, indicated by data times 304, 306, because not every external device is capable of responding to the bus unit 220 within a single bus cycle. Nearly all information transfer between the processor 202 and external devices connected to the host bus 206 occurs in a similar fashion.

Figure 4:
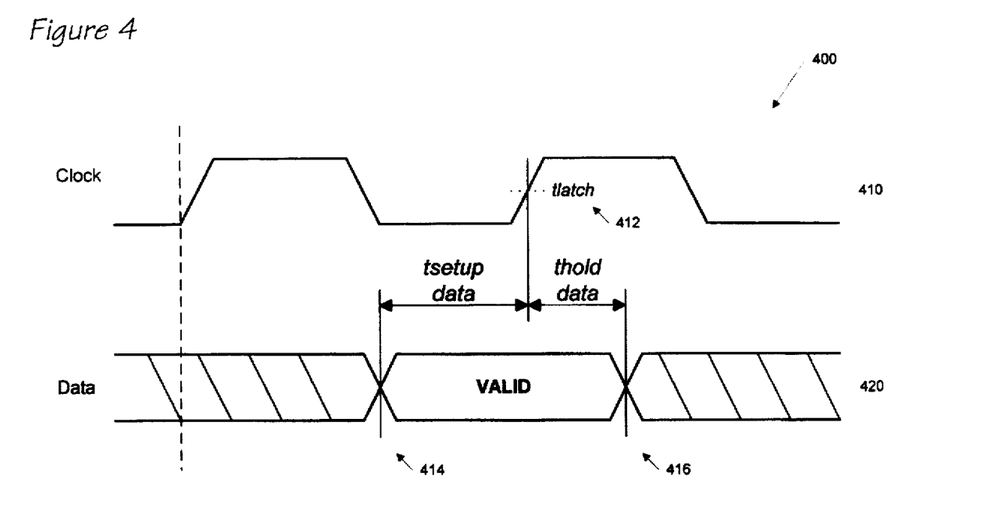
FIG. 4 is a timing diagram illustrating setup and hold time for a data signal.

With the above understanding of how information is transferred between a processor and external devices, attention will now focus on the setup and hold times required for those signals involved in information transfer (i.e., address, data and control signals). Referring to FIG. 4, a timing diagram 400 is shown which illustrates setup and hold time criteria for signals transmitted between the bus unit 220 and external devices connected to the system bus 206 of FIG. 2. To guarantee that information is received correctly by an external device that is being written to, every device capable of receiving data requires that a manufacturer specified setup and hold time be satisfied. In other words, the data must be present on the device's inputs for at least the specified setup time before the latch point and must remain present for at least the specified hold time after the latch point or the device may not receive the data correctly.

More specifically, a tlatch 412 threshold is designated on a clock signal 410 as the point where data will be read by the external device. However, data signals 420 must be present on the data bus at a time tsetup 414 prior to the clock signal 410 transitioning through tlatch 412, to allow the data signals 420 to stabilize on the data bus. And, the data signals 420 must remain stable on the data bus for a period of time thold 416 after the clock signal 410 transitions through tlatch 412, to allow the external device to latch the data. Thus, valid data (i.e., data desired to be transferred) must remain on the data bus from a time tsetup 414 through a time thold 416 surrounding a time tlatch 412 on the clock signal 410, to allow external devices to read the data. One skilled in the art understands that the use of data signals in the timing diagram 400 is for convenience only, and that setup and hold times apply to address and control signals as well.

Figure 5:
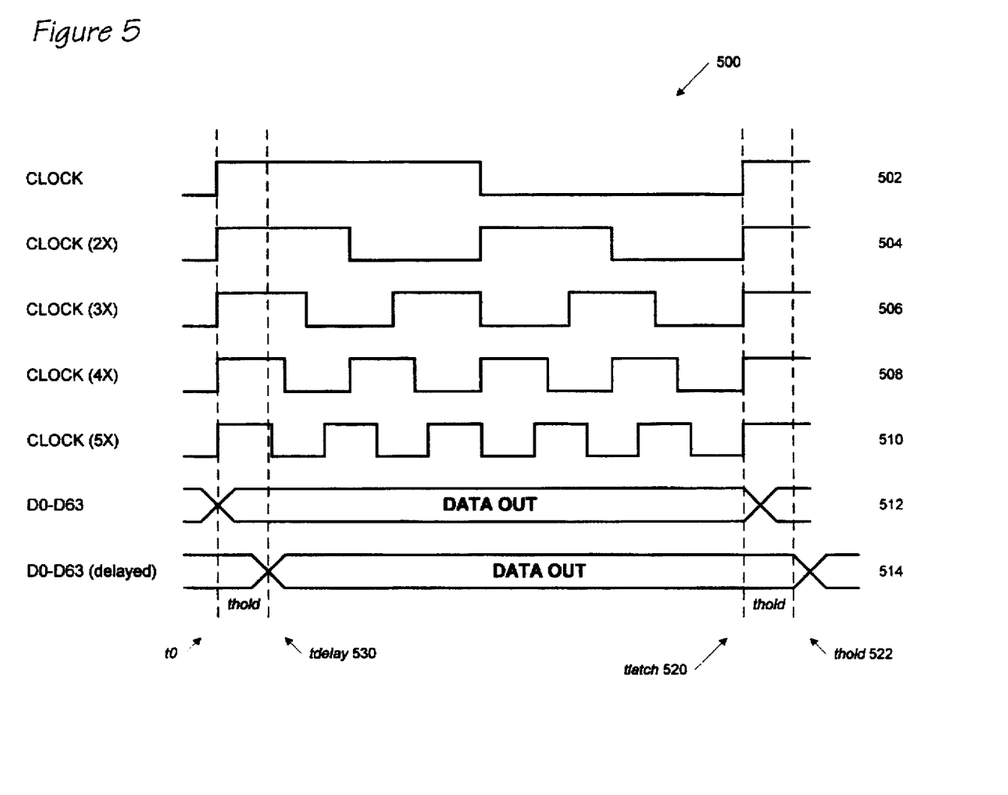
FIG. 5 is a timing diagram illustrating multiple internal operating frequencies for a processor, and the effect of delaying an output signal to provide sufficient hold time.

Now referring to FIG. 5, a timing diagram 500 is shown which illustrates the relationship between multiplied clock signals and hold time for data transmission. A clock signal 502 is provided, which in one embodiment represents the clock used by a host bus which is external to a microprocessor. The clock signal 502 may be provided to a clock input on a microprocessor which multiplies the clock signal 502 by an integer value from 2–5 to achieve an internal clock for the microprocessor of either clock 2X 504, clock 3X 506, clock 4X 508 or clock 5X 510. The multiplied clock signal is used for timing of activity within the microprocessor. This allow the microprocessor to operate at speeds exceeding the speed of the host bus.

Looking specifically at data signals D0–D63 512, if no hold time were required, then at a time tlatch 520, data on the data signals 512 could be read by an external device, and the data signals 512 could transition to other values. However, as indicated above, the data signals 512 must remain on the data bus for an additional time thold 522 to allow the external devices time to latch the data. One method of insuring that the data is present through thold 522 is to simply delay the transfer out of the data signals by a period of time equivalent to thold 522, represented by tdelay 530. As will be further discussed with reference to FIG. 6 below, the delay is achieved by delaying the internal clock multiple by a fixed amount, and applying this delayed signal to the bus unit. A waveform 514 illustrates that an effect of delaying transmission of the data signals by tdelay 530 is to allow the data signals to remain on the bus for a period of time thold 522 after tlatch 520.

Figure 6:
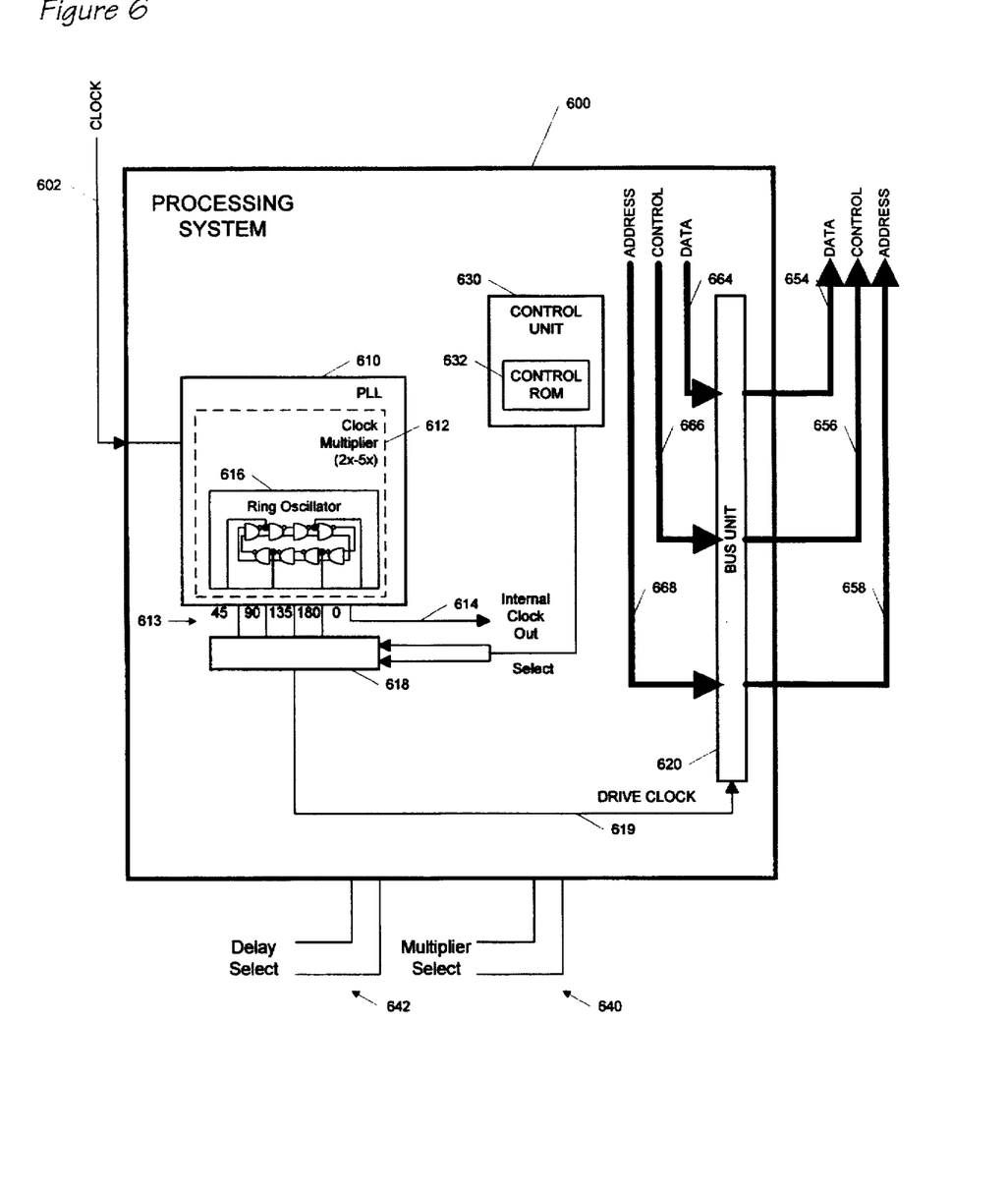
FIG. 6 is a block diagram of a processing system according to the present invention, which includes a clock multiplier, a ring oscillator, and selection logic for selecting an output of the ring oscillator to be used as a drive clock into a bus unit.

Now referring to FIG. 6, a processing system 600 is shown which incorporates features of the present invention. The processing system 600 includes a bus unit 620 connected to a data bus 654, a control bus 656 and an address bus 658, which are external to the processing system 600. The bus unit 620 is also connected to a data bus 664, a control bus 666, and an address bus 668 which are internal to the processing system 600. Transfer of information between the processing system 600 and external devices is accomplished via the bus unit 620. It should be understood that although not shown, the processing system 600 also may incorporate an instruction unit, an execution unit, an address unit, and other circuits which are known in the art.

In addition, the processing system 600 includes a phased locked loop circuit (PLL) 610 connected to an external clock 602. For purposes of discussion, the external clock 602 is presumed to operate at a speed of either 50, 60 or 66 MHz, which is also the speed of the external bus. The PLL 610 includes a clock multiplier 612 which is capable of multiplying the clock signal 602 by a predefined value. In one embodiment, the predefined value may be an integer from 2 to 5, but one skilled in the art is aware that fractional multiplication may be defined as well. The predefined value may be defined either via a hardware circuit, not shown, or through pull-up multiplier pins 640 external to the processing system 600. The PLL 610 outputs an internal clock signal 614, which is the result of the clock multiplication, to the rest of the processing system 600 for operation.

Part of the clock multiplier 612 includes a differential ring oscillator 616 within the PLL 610. The ring oscillator 616 provides a number of signal outputs which are identical in frequency to the internal clock 614, but which are delayed by fixed phase offsets from the internal clock 614. In one embodiment, the ring oscillator provides outputs 613 which are 45, 90, 135, 180 and 0 degrees offset from the internal clock, but other phase offsets may easily be provided for. These fixed offset outputs 613 are relative phase offsets from the internal clock 614 regardless of whether the internal clock 614 is a 2X, 3X, 4X or 5X multiple of the external clock 602. The 45, 90, 135, 180 degree outputs are provided to clock selection logic 618 which selects one of the outputs 613 to be used as a drive clock signal 619. The clock selection logic 618 is also capable of inverting each of the 45, 90, 135, 180 degree outputs by 180 degrees to achieve 225, 270, 315 and 0 degree outputs. The drive clock signal 619 is provided as an input to the bus unit 620 for controlling the timing of information transfer between the processing system 600, and devices external to the processing system 600.

Referring back to FIG. 5, the time tdelay 530 is shown to provide a fixed delay from a time $t_0$. Although the time tdelay 530 is a fixed offset from $t_0$, when viewed relative to each of the multiplied clock signals 504–510, it should be clear that tdelay 530 occurs at a different phase offsets for each of the multiplied clock signals 504–510. Thus, the phase offset required for the drive clock 619 to provide a particular delay is dependent on which one of the multiplied clock signals 504–510 is used as the internal clock 614.

In one embodiment, the clock selection logic 618 is also connected to a control unit 630 which contains a control ROM 632. The control unit 630 is used to select one of the outputs 613 to be used as the drive clock 619. The criteria used by the control unit 630 to select the appropriate one of the outputs 613 for use as the drive clock 619 includes the speed at which the internal clock 614 is operating, and the amount of delay desired to provide for a specified hold time. Using an external clock of either 50, 60, or 66 MHz, and possible internal clock multiples of 1–5, the tables below illustrate the particular phase outputs 613 which need to be selected by the control unit 630 to provide a delay time of at least 2 ns for the drive clock 619.

| | 50 MHz External Clock | | | |
|---|---|---|---|---|
| Clock multiple | Internal Frequency (MHz) | Internal Clock Period (ns) | Hold time provided (ns) | Phase output (degrees) |
| 1X | 50 | 20 | 2.5 | 45 |
| 2X | 100 | 10 | 2.5 | 90 |
| 3X | 150 | 6.6 | 2.5 | 135 |
| 4X | 200 | 5 | 2.5 | 180 |
| 5X | 250 | 4 | 2.5 | 225 |

| | 60 MHz External Clock | | | |
|---|---|---|---|---|
| Clock multiple | Internal Frequency (MHz) | Internal Clock Period (ns) | Hold time provided (ns) | Phase output (degrees) |
| 1X | 60 | 16.6 | 2.08 | 45 |
| 2X | 120 | 8.3 | 2.08 | 90 |
| 3X | 180 | 5.5 | 2.08 | 135 |
| 4X | 240 | 4.16 | 2.08 | 180 |
| 5X | 300 | 3.33 | 2.08 | 225 |

| | 66 MHz External Clock | | | |
|---|---|---|---|---|
| Clock multiple | Internal Frequency (MHz) | Internal Clock Period (ns) | Hold time provided (ns) | Phase output (degrees) |
| 1X | 66.6 | 15 | 1.89 | 45 |
| 2X | 133 | 7.5 | 1.89 | 90 |
| 3X | 200 | 5 | 1.89 | 135 |
| 4X | 266 | 3.76 | 1.89 | 180 |
| 5X | 333 | 3 | 1.89 | 225 |

One possible benefit associated with selectable phase delays is that an absolute hold time may be provided for a particular external clock, regardless of the integer clock multiple used by the processor. In the table above, for example, a hold time of 1.89 ns may be provided for a 66 MHz external clock, regardless of the internal clock multiple (1X–5X), by particularly selecting an appropriate phase delay.

The control unit 630 may be provided with the internal operating speed of the processing system 600, either via the multiplier select pins 640, the internal clock speed select circuitry (not shown), or by other mechanisms that are known to those skilled in the art. The above tables are stored within the control ROM 632, and upon power-up, are accessed to allow the control unit 630 to indicate to the selection logic 618 which one of the outputs 613 is to be provided as the drive clock 619 to the bus unit 620.

In an alternative embodiment, delay select pins 642 may be provided external to the processing system 600 which allow a computer designer to particularly specify which phase output 613 from the PLL 610 is to be used as the drive clock, if alternative hold times are desired.

Figure 7:
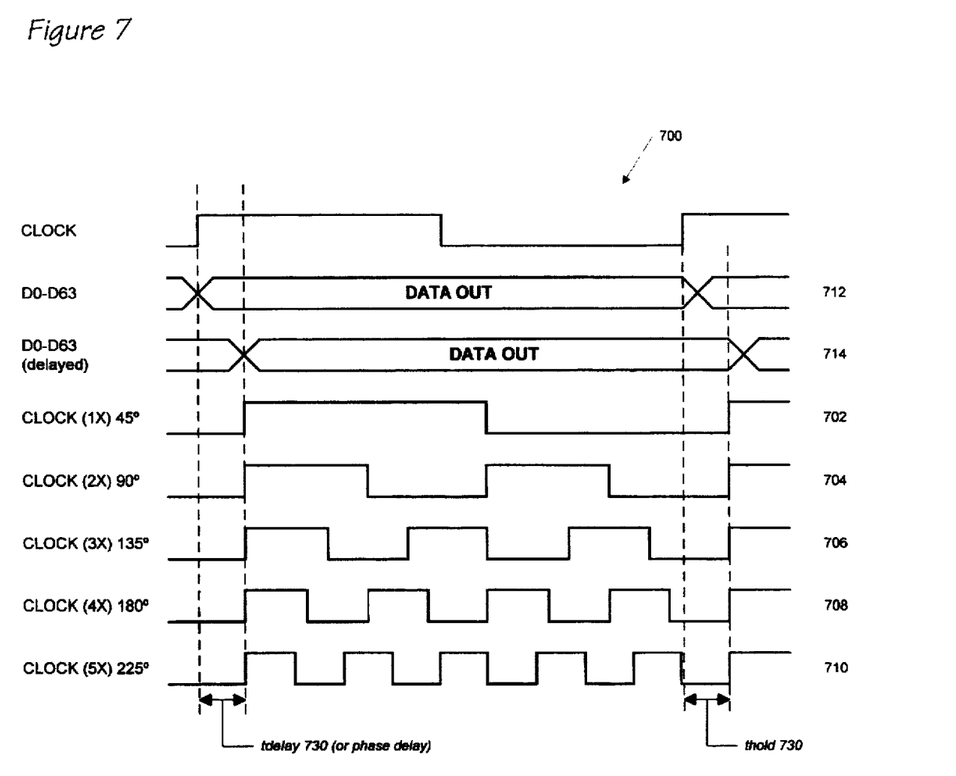
FIG. 7 is a timing diagram illustrating the different phase delays required for different internal clock speeds, to provide sufficient hold time.

Referring now to FIG. 7, a timing diagram 700 is shown which illustrates selection of different phase offset signals 613 to be used as a drive clock 619, depending on the internal operating speed of the processing system 600, using an external clock of either 50 or 60 MHz. As in FIG. 5, data out signals 712 are provided to show data line transition if no hold time was required. And, data out signals 714 are provided to show data line transition required to meet a specified hold time 730. To provide a delay of tdelay 730, one of the phase offset signals 613 is selected to be used as the drive clock 619 to the bus unit 620, depending on the speed of the internal clock. If the internal clock is operating at 1X (the speed of the external clock 602), then the 45 degree output 613 is selected, and the signal 702 is used as the drive clock 619. If the internal clock is operating at 2X, then the 90 degree output 613 is selected, and the signal 704 is used as the drive clock 619. If the internal clock is operating at 3X, then the 135 degree output 613 is selected, and the signal 706 is used as the drive clock 619. If the internal clock is operating at 4X, then the 180 degree output 613 is selected, and the signal 708 is used as the drive clock 619. If the internal clock is operating at 5X, then the 225 degree output 613 is selected, and the signal 710 is used as the drive clock 619.

Thus, although the internal and external operating speed of the processing system 600 may vary, depending on the computer system in which the processing system 600 is used, a specified hold time is achieved for each combination. And, by utilizing a selectable phase offset of the internal clock 614, as a drive clock 619 input to the bus unit 620, a processing system is provided which is capable of operating at a number of different internal speeds, and in a number of different external bus speed environments, without requiring circuit modification to achieve a specified hold time.

Although the present invention has been described in considerable detail with reference to certain preferred versions thereof, other versions are possible. For example, rather than utilizing a control unit and a control ROM to select an appropriate phase offset drive clock, a dedicated circuit may be provided which logically selects the offset based on the clock multiple. This circuit may be incorporated into the PLL 610, or within the selection logic 618. Also, rather than utilizing a differential ring oscillator, an odd number of single input inverting stages may be used to provide corresponding offsets of an internal clock. In addition, control of phase offset input to the bus unit may be accomplished either by circuitry internal to the processing system, by logic signals on pins connected to the processing system, or possibly even through software connected to the processing system, at boot up. For example, BIOS could provide parameters for selection, or actual selection of, phase offset for hold time delay. Furthermore, multiple internal drive clocks may be individually configurable to allow different phase delays for particular buses external to the processor. For example, an address bus may have one set of parameters while the data bus may have a different set of parameters. Also, incremental phase differences other than 45 degrees may be chosen. For example, an increment of 30 degrees may be more applicable in some environments. All of these variations are contemplated by the inventor.

Although the present invention and its features and advantages have been described in detail, those skilled in the art should appreciate that they can readily use the disclosed conception and specific embodiment(s) as a basis for designing or modifying other structures for carrying out the same purposes of the present invention, and that various changes, substitutions and alterations can be made without departing from the spirit and scope of the invention as defined by the appended claims.

We claim:

1. A computer processing system, the processing system communicating with devices external to the processing system, the processing system comprising:

an external clock signal, for establishing a time reference for said processing system, and for the devices external to said processing system;

a clock multiplier, connected to said external clock signal, for generating an internal clock signal which is a multiple of said external clock signal;

an internal bus, for transmitting information within said processing system;

an external bus, for transmitting said information to the devices external to said processing system;

a bus unit, connected to said internal bus, and to said external bus, for transmitting said information between said internal bus and said external bus; and a configurable clock adjust system, connected to said clock multiplier, and to said bus unit, for providing a drive clock signal to said bus unit, said drive clock signal providing configurable hold time for said information transmitted by said bus unit from said internal bus to said external bus.

2. The computer processing system, as recited in claim 1, wherein said external clock signal is generated by an oscillator.

3. The computer processing system, as recited in claim 1, wherein said external clock signal is a periodic digital signal.

4. The computer processing system, as recited in claim 1, wherein one of the devices external to the processing system comprises a memory system.

5. The computer processing system, as recited in claim 1, wherein said clock multiplier is a phase locked loop.

6. The computer processing system, as recited in claim 1, wherein said clock multiplier generates an internal clock signal which has twice the frequency of said external clock signal.

7. The computer processing system, as recited in claim 1, wherein said clock multiplier generates an internal clock signal which has three times the frequency of said external clock signal.

8. The computer processing system, as recited in claim 1, wherein said internal bus comprises:

an address bus;

a control bus; and a data bus.

9. The computer processing system, as recited in claim 1, wherein the speed of said internal bus is controlled by said internal clock signal.

10. The computer processing system, as recited in claim 1, wherein said external bus comprises:

an address bus;

a control bus; and a data bus.

11. The computer processing system, as recited in claim 1, wherein the speed of said external bus is controlled by said external clock signal.

12. The computer processing system, as recited in claim 1, wherein said bus unit further comprises:

address latches and drivers, connected to an address bus portion of said internal and said external buses;

bus control, connected to a control bus portion of said internal and said external buses; and data transceivers, connected to a data bus portion of said internal and said external buses.

13. The computer processing system, as recited in claim 1, wherein said configurable clock adjust system further comprises a phase delay circuit having a plurality of output taps.

14. The computer processing system, as recited in claim 13, wherein said output taps provide a plurality of phased outputs having the same frequency as said internal clock signal.

15. The computer processing system, as recited in claim 14, wherein said plurality of phased outputs differ in phase from each other, and from said internal clock signal.

16. The computer processing system, as recited in claim 15, wherein said configurable clock adjust system further comprises selection logic, connected to said phase delay circuit, for selecting one of said plurality of phased outputs to be said drive clock signal for said bus unit.

17. The computer processing system, as recited in claim 16, wherein said selected one of said plurality of phased outputs is selected to provide sufficient hold time for said information transmitted by said bus unit from said internal bus to said external bus.

18. The computer processing system, as recited in claim 16, wherein said selected one of said plurality of phased outputs is selected based on the frequency of the internal clock signal.

19. The computer processing system, as recited in claim 14, wherein said plurality of phased outputs have phases which comprise:

45 degrees;
90 degrees;
135 degrees; and
180 degrees.

20. The computer processing system, as recited in claim 19, wherein said phases further comprise phase inversions for each of said phases.

21. A configurable drive clock generator for selectably establishing hold time for signals output from a processing device operating at an internal clock speed, to external devices operating at an external clock speed, the configurable drive clock generator comprising:

a clock multiplier, connected to an external clock signal, for multiplying said external clock signal by a predetermined amount, and for producing an internal clock signal;

a ring oscillator, connected to said internal clock signal, for providing a plurality of output signals, said plurality of output signals having the same frequency as said internal clock signal, but differing in phase from each other, and from said internal clock signal; and selection logic, connected to said plurality of output signals, for selecting one of said plurality of output signals to be a drive clock signal;

wherein said drive clock signal establishes said hold time for signals output from the processing device to the external devices.

22. The configurable drive clock generator, as recited in claim 21, wherein said clock multiplier further comprises speed selection logic, for indicating to said clock multiplier said predetermined amount.

23. The configurable drive clock generator, as recited in claim 22, wherein said predetermined amount includes 2, 3, 4 and 5.

24. The configurable drive clock generator, as recited in claim 21, wherein said internal clock signal is a selected multiple of said external clock signal.

25. The configurable drive clock generator, as recited in claim 21, wherein said plurality of output signals have phases which are offset by an incremental amount.

26. The configurable drive clock generator, as recited in claim 25, wherein said incremental amount is 45 degrees.

27. The configurable drive clock generator, as recited in claim 25, wherein said incremental amount is 30 degrees.

28. The configurable drive clock generator, as recited in claim 21, wherein said selection logic further comprises a control unit, connected to said internal clock signal, for determining, based on the speed of said internal clock signal, which of said plurality of output signals should be selected to be said drive clock signal.

29. The configurable drive clock generator, as recited in claim 21, wherein said selection logic further comprises delay select lines, connected to the processing device, for communicating to said selection logic which of said plurality of output signals should be used as said drive clock signal.

30. A method for controlling the hold time of signals output from a processing system by a bus unit to external devices, wherein the processing system operates at an internal clock speed which may be varied, and the external devices operate at an external clock speed, the method comprising the steps of:

providing a plurality of differing phase delay clocks, each of the delay clocks having the same frequency as the internal clock speed which may be varied;

determining which one of the plurality of differing phase delay clocks will provide the desired hold time for the signals output by the bus unit; and selecting the one of the plurality of differing phase delay clocks to be provided to said bus unit as a drive clock.

31. The method for controlling the hold time of signals output by a bus unit, as recited in claim 30, wherein the internal clock speed is a multiple of the external clock speed.

32. The method for controlling the hold time of signals output by a bus unit, as recited in claim 30, wherein the hold time is the amount of time required by the external devices to read the signals output from the processing system.

33. The method for controlling the hold time of signals output by a bus unit, as recited in claim 30, wherein the internal clock speed is varied by multiplier select lines on the processing system.

34. The method for controlling the hold time of signals output by a bus unit, as recited in claim 30, wherein said step of determining further comprises the steps of:

determining the internal clock speed of the processing system; and determining the amount of hold time desired for the external devices.

35. The method for controlling the hold time of signals output by a bus unit, as recited in claim 30, wherein the phase delay of the selected one of the delay clocks provides a delay corresponding to the desired hold time.

* * * * *